United States Patent
Jolley

(10) Patent No.: US 6,223,620 B1
(45) Date of Patent: May 1, 2001

(54) TILT RELEASE SYSTEM FOR A STEERING COLUMN

(75) Inventor: William A. Jolley, Keego Harbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/288,416

(22) Filed: Apr. 8, 1999

(51) Int. Cl.[7] .................................................... B62D 1/18
(52) U.S. Cl. ............................................. 74/493; 280/775
(58) Field of Search ................................ 74/493; 280/775

(56) References Cited

U.S. PATENT DOCUMENTS

| | | |
|---|---|---|
| 3,857,454 | 12/1974 | Kobayashi . |
| 4,400,012 | 8/1983 | Otsuka . |
| 4,495,833 * | 1/1985 | Fourrey et al. .......................... 74/493 |
| 4,527,444 | 7/1985 | McKee et al. . |
| 4,660,673 | 4/1987 | Yoshii . |
| 5,188,392 | 2/1993 | Sugiki et al. . |
| 5,718,471 | 2/1998 | McHorse . |
| 5,802,924 | 9/1998 | Johnson et al. . |

FOREIGN PATENT DOCUMENTS

| | | | |
|---|---|---|---|
| 2 331 632 * | 1/1974 | (DE) ........................................ | 74/493 |
| 57-58557 * | 4/1982 | (JP) ......................................... | 74/493 |

* cited by examiner

Primary Examiner—David A. Bucci
Assistant Examiner—William C Joyce
(74) Attorney, Agent, or Firm—Lawrence J. Shurupoff

(57) ABSTRACT

A tilt release system for releasing a locking mechanism operable to retain a tiltable end portion of an elongated steering column of an automotive vehicle in angularly adjusted position including a shroud is provided on the tiltable end portion of the steering column. A bracket is mounted on the inside of the shroud. A lever is pivoted on the bracket and projects outwardly through a hole in a side wall of the shroud. The lever can be rotated by a left hand finger of an operator seated behind the steering column. A recess in the rear wall of the shroud provides a reaction surface adjacent to the lever against which the thumb of the operator may be placed while rotating the lever with the finger. There is a connection between the lever and the locking mechanism to release the locking mechanism when the lever is rotated.

1 Claim, 4 Drawing Sheets

TILT RELEASE SYSTEM FOR A STEERING COLUMN

CROSS-REFERENCE TO RELATED APPLICATIONS

This application is related to co-pending U.S. patent applications, Ser. No. 09/288,596, filed on Apr. 8, 1999, entitled "Tilt Release System for a Steering Column," and Ser. No. 09,288,276, filed on Apr. 8, 1999, entitled "Tilt Release System for a Steering Column."

This invention relates generally to a tilt release system for releasing the locking mechanism of a tilt steering column of an automotive vehicle.

BACKGROUND OF THE INVENTION

A tilt steering column allows an operator of a vehicle to adjust the height and angle of the steering wheel depending on the operator's stature, seat position and comfort. Typically, the steering wheel can be moved to an uppermost position to allow the operator or driver to get in and out of the driver's seat more easily.

A locking mechanism is provided for retaining the steering column in an adjusted position. The locking mechanism must be released to adjust the steering column. Typically, the locking mechanism is released by actuation of a lever by a hand of the driver. Usually this involves a rearward movement of the lever by the left hand. Actuation of the lever is not particularly difficult, but repeated actuation can place a strain on the wrist. A tilt release system is needed which improves ergonomics and minimizes the possibility of wrist strain.

SUMMARY OF THE INVENTION

In accordance with the present invention, the locking mechanism is released by movement of a lever by a finger of a hand of the driver. A reaction surface is provided adjacent to the lever against which a thumb of the driver may be placed while operating this lever. In this manner, a pinching action is carried out in order to effect release of the locking mechanism, without straining any part of the hand or wrist of the driver.

Preferably, the reaction surface is a recess in a wall of the shroud of the steering column. This recess may be in the rear wall of the shroud adjacent the left side wall thereof. In the preferred embodiment, the lever rotates about a pivot axis perpendicular to the longitudinal axis of the steering column, and moves from a forward retracted position to a rearward actuating position.

One object of this invention is to provide a tilt release system for the locking mechanism of a steering column having the foregoing features and capabilities.

Another object is to provide a tilt release system for a steering column which is rugged and durable in use, of simple design and easy to operate.

These and other objects, features and advantages of the invention will become more apparent as the following description proceeds, especially when taken in connection with the accompanying drawings.

BRIEF DESCRIPTION OF THE DRAWINGS

FIG. 2A is an enlarged fragmentary view of a portion of FIG. 2.

DETAILED DESCRIPTION OF THE PREFERRED EMBODIMENT

Figure 1:
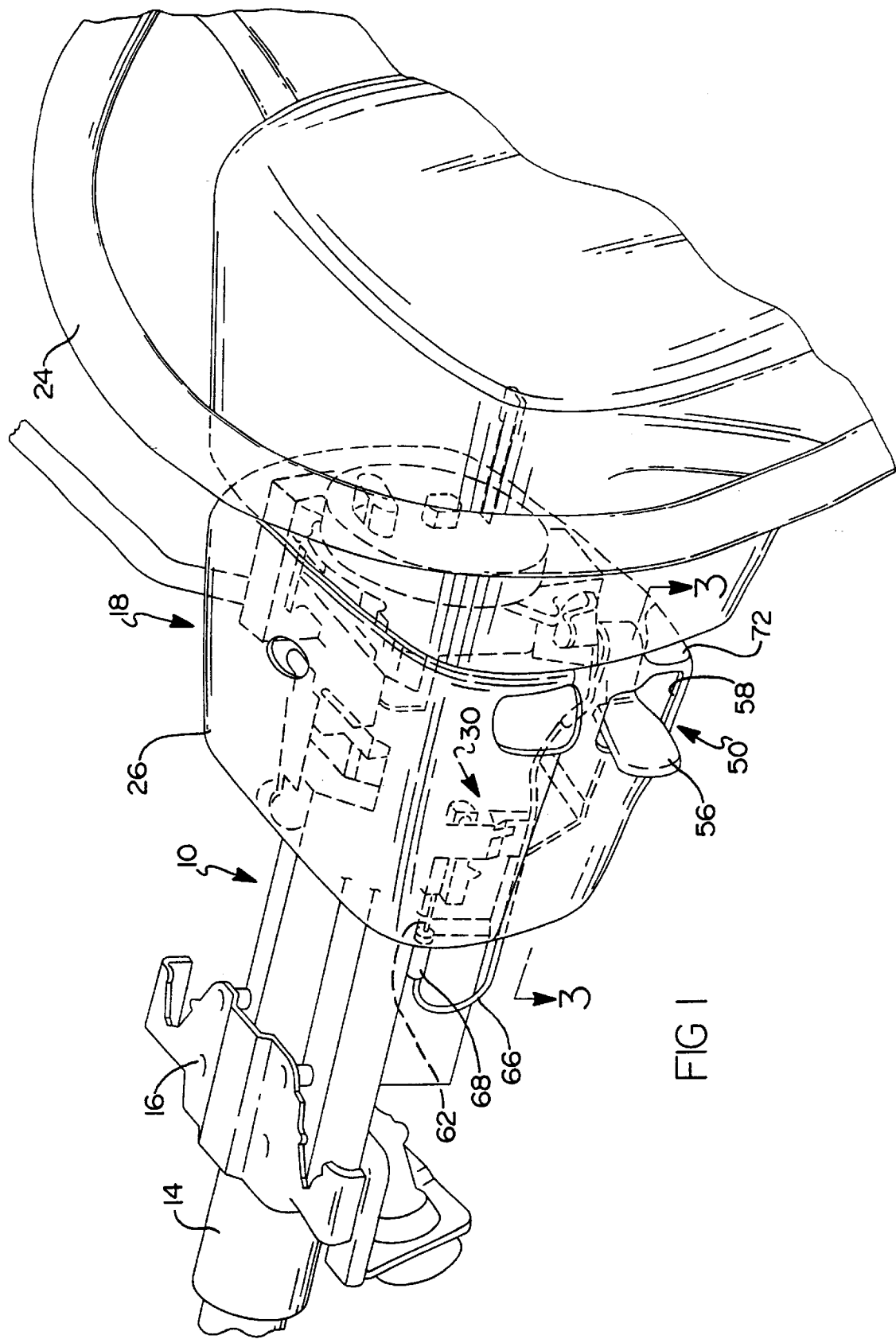
FIG. 1 is a fragmentary perspective view of a steering column having a tilt release system constructed in accordance with the invention.

Referring now more particularly to the drawings, the steering column 10 extends in an upward and rearward direction in a vertical plane lengthwise of the vehicle in which it is installed. The steering column 10 includes an elongated steering shaft 12 within an elongated tubular jacket 14. The jacket is secured to rigid vehicle support structure including the mounting bracket 16. The steering shaft 12 extends lengthwise within the steering column. The shaft 12 is connected at its lower end by a suitable coupler of known construction to a steering gear assembly (not shown) for steering the wheels of the vehicle.

The steering column has a tiltable upper end portion 18. The tiltable upper end portion 18 includes a tilt head 20 pivoted at 21 to the upper end of the shaft 12. A steering shaft extension 22 carried by the tilt head 20 has a steering wheel 24 on its upper end. A hollow shroud 26 is secured to the tilt head 20 and encloses the tilt head and shaft extension.

Figure 2:
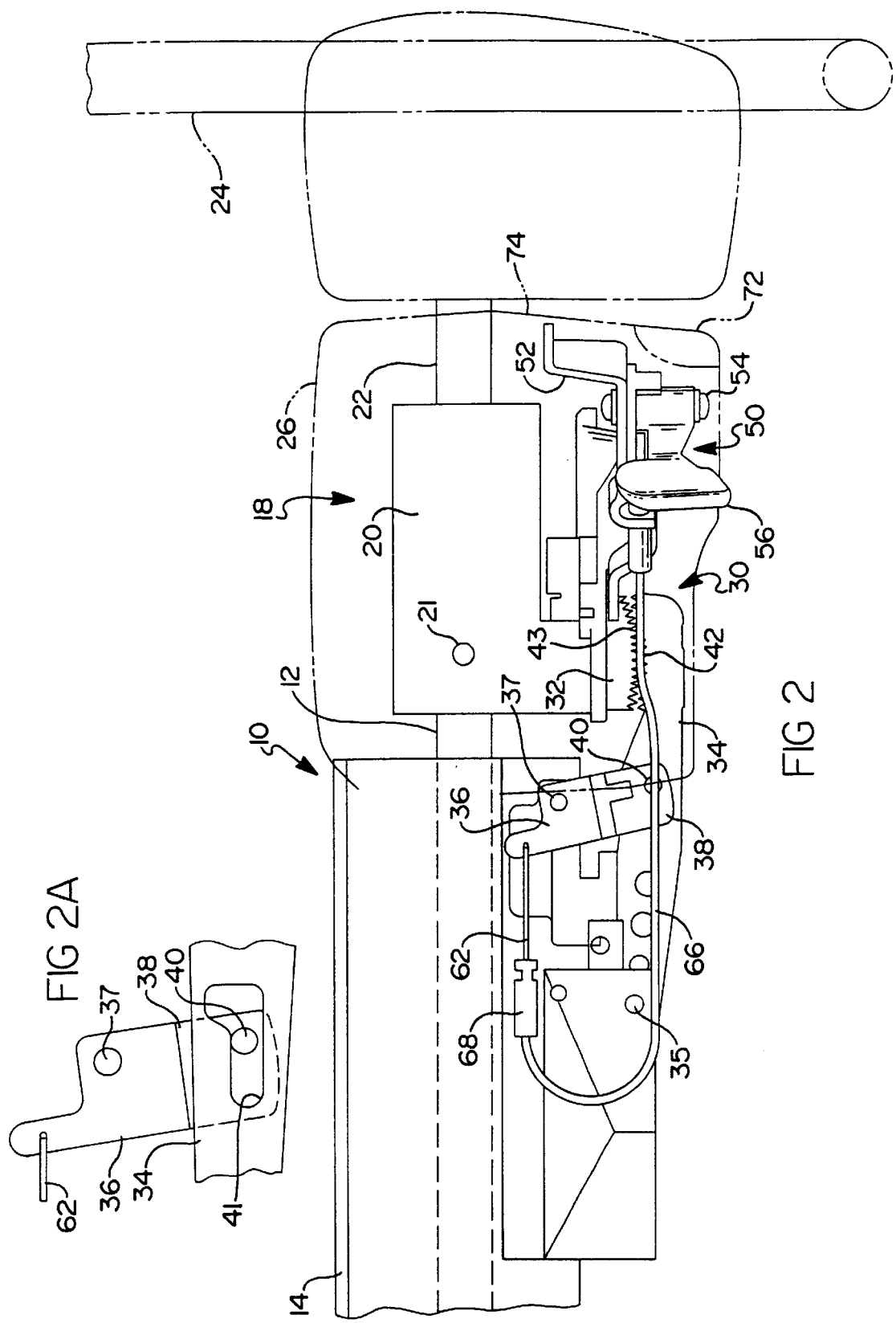
FIG. 2 is a side view of the structure shown in FIG. 1, with parts including a shroud in phantom to better illustrate the locking mechanism and the release system.

The upper end portion 18 of the steering column is locked in angularly adjusted position by a locking mechanism 30 (FIG. 2). The locking mechanism includes a rack 32 secured to the tilt head 20 and a pawl 34 pivoted at 35 to the jacket 14. An arm 36 pivoted to the jacket 14 at 37 has a bifurcated end providing spaced apart members 38 which straddle the pawl. A pin 40 connects the members 38 and extends through a kidney-shaped slot 41 (FIG. 2A) in the pawl 34 so that when the arm is turned clockwise in FIG. 2 and FIG. 2A the pawl is raised and the teeth 42 on the pawl engage the teeth 43 on the rack to lock the tilt head in angularly adjusted position. When the arm is turned counterclockwise, the pawl descends and retracts to disengage the rack. A spring (not shown) normally biases the arm 36 clockwise to engage the pawl teeth with the rack teeth. The arm is swung counterclockwise against the force of the spring by a tilt release system 50 which will now be described.

The tilt release system 50 includes a bracket 52 rigidly secured to the inside of the shroud 26. A cylindrical pivot pin 54 is mounted on the bracket for rotation. The axis of rotation of the pivot pin 54 is perpendicular to a plane in which the longitudinal axis of the steering column is disposed, which plane is perpendicular to the vertical plane occupied by the steering column.

Figure 3:
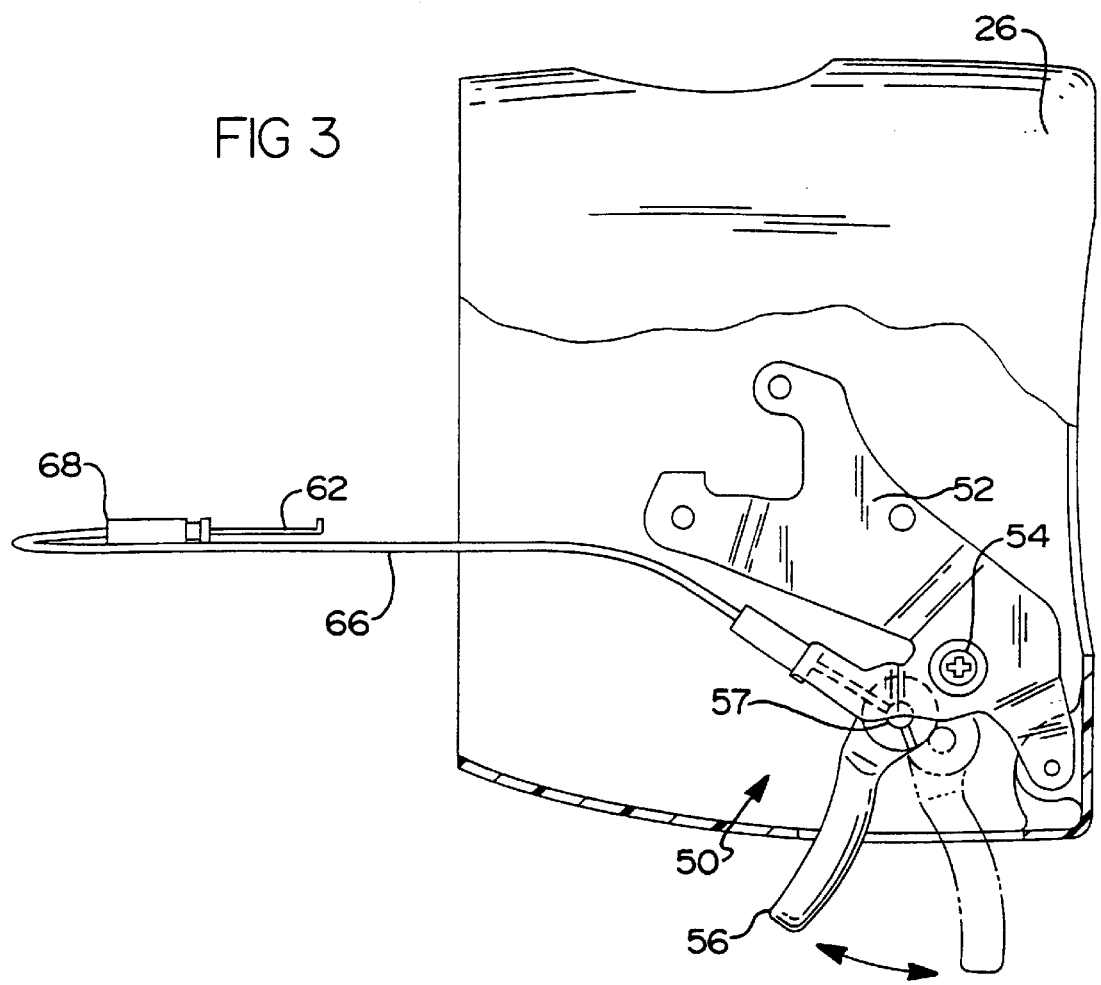
FIG. 3 is an enlarged top view showing the shroud partly broken away to illustrate the release system.
Figure 4:
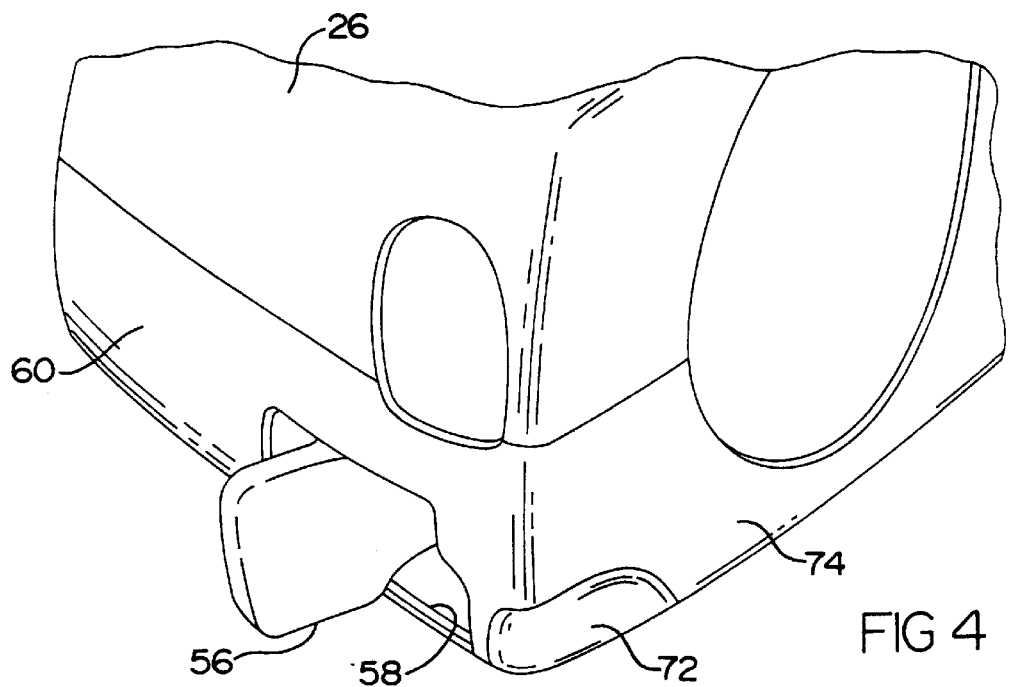
FIG. 4 is a fragmentary perspective view of the lower left hand corner of the shroud, showing the lever for releasing the locking mechanism projecting through an opening in the side wall of the shroud.

An actuating lever 56 is mounted on the pivot pin 54 (FIG. 3) for rotation therewith. The lever extends outwardly of the shroud through a hole 58 (FIG. 4) in the lower rear corner of the left side wall 60 of the shroud adjacent the rear wall 74. An elongated cable 62 has one end pivoted to the lever 56 at a point 57 between the pivot pin 54 and the outer free end of the lever. The opposite end of the cable is connected to the arm 36. A tubular sheath 66 slidably receives the cable. The sheath 66 is healed by a support 68 on the steering column jacket 14 to direct the end of the cable rearwardly toward the arm 36. When the lever 56 is rotated rearwardly on the pivot pin 54 to turn from the forward retracted position shown in solid lines in FIG. 3 to the rearward actuating position shown in broken lines, the cable turns the arm 36 counterclockwise to release the locking mechanism.

Figure 5:
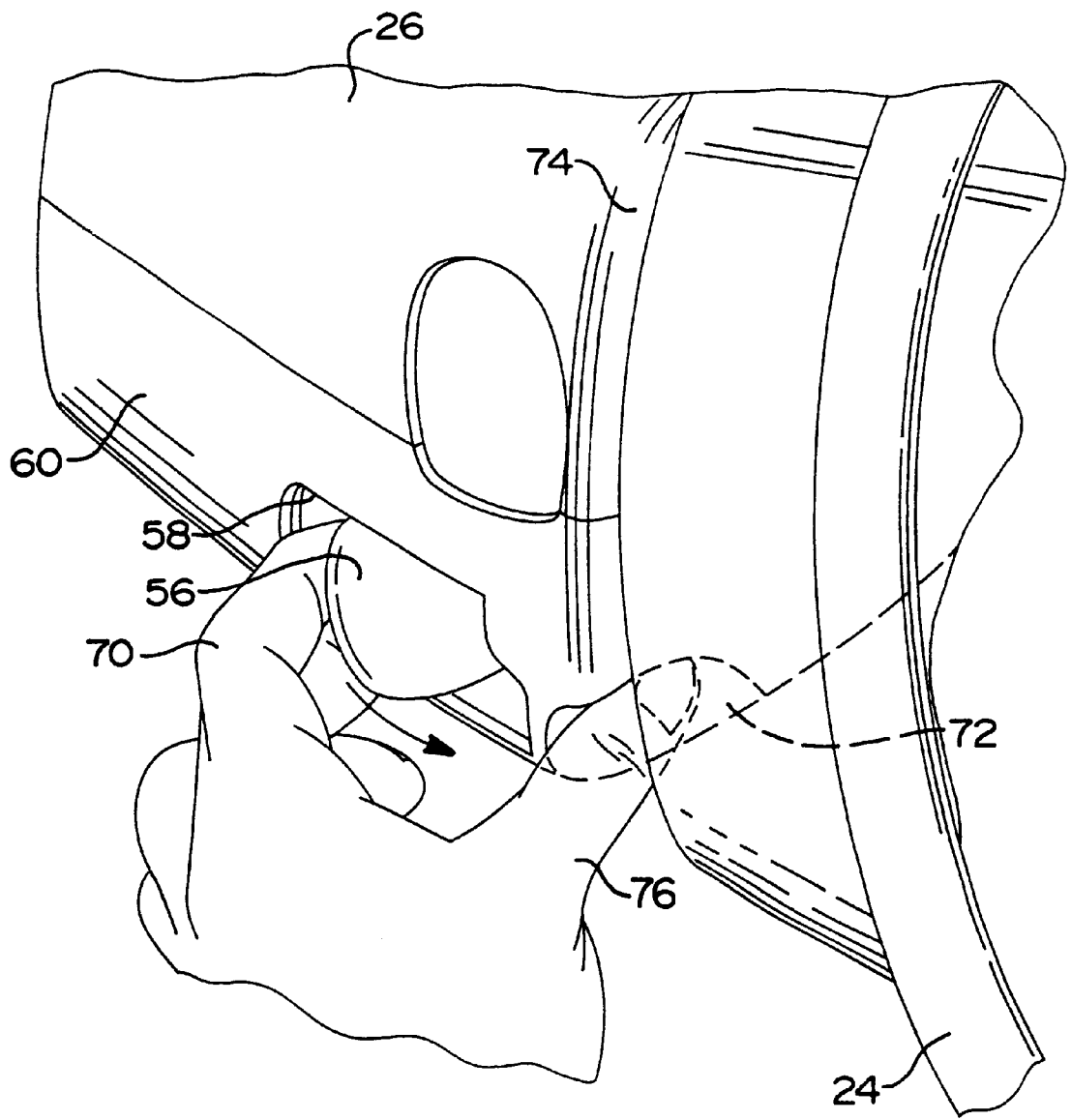
FIG. 5 is a view similar to FIG. 4 but showing the lever being actuated by a finger on the left hand of the driver, with the driver's thumb shown in a reaction recess in the shroud.

As shown in FIG. 5, the lever 54 is rotated rearwardly by an index finger 70 of the left hand of a driver seated behind the steering column. To reduce if not altogether eliminate hand strain, a reaction recess 72 is provided in the rear wall 74 of the shroud 26, adjacent to and rearwardly of the outwardly projecting end of the lever 54. When rotating the lever 54 rearwardly by pulling with the finger 70, the driver's thumb 76 is placed in the reaction recess. A pinching action is carried out to pull the lever 54 rearwardly and release the locking mechanism 30, without straining the hand, finger, thumb or wrist of the driver.

What is claimed is:

1. A tilt release system for releasing a locking mechanism operable to retain a tiltable end portion of an elongated steering column of an automotive vehicle in angularly adjusted position comprising, a shroud on the tiltable end portion of the steering column, a bracket mounted on said shroud, a lever, means pivotally mounting said lever on said bracket in a position to be rotated in one direction by a left hand finger of an operator seated rearwardly of the steering column, means providing a reaction surface on said shroud adjacent to said lever against which a left hand thumb of the operator may be placed while rotating the lever with the finger in said one direction, and means providing a connection between the lever and the locking mechanism to release the locking mechanism when the lever is rotated in said one direction, wherein said shroud has a rear wall and a left side wall and a hollow interior, said bracket is located in said hollow interior, said lever projects through a hole in the left wall of said shroud adjacent to the rear wall thereof and terminates in an outwardly projecting end, said lever, when rotated in said one direction to release the locking mechanism, moves from a forward retracted position to a rearward actuating position and can be so moved by pulling with the left hand finger of the operator, and said reaction surface comprises a recess in said rear wall adjacent to and rearwardly of the outwardly projecting end of said lever and the hole through which the lever projects, in a position such that when the lever is rotated in said one direction by pulling with the left hand finger of the operator the left hand thumb of the operator may be placed in said recess so that together the left hand finger and thumb carry out a pinching action to pull the lever rearwardly and release the locking mechanism without straining the finger or the thumb of the operator.

\* \* \* \* \*